(No Model.)
G. C. TWYMAN & M. E. THOMAS.
INSECT EXTERMINATOR.
No. 534,127. Patented Feb. 12, 1895.
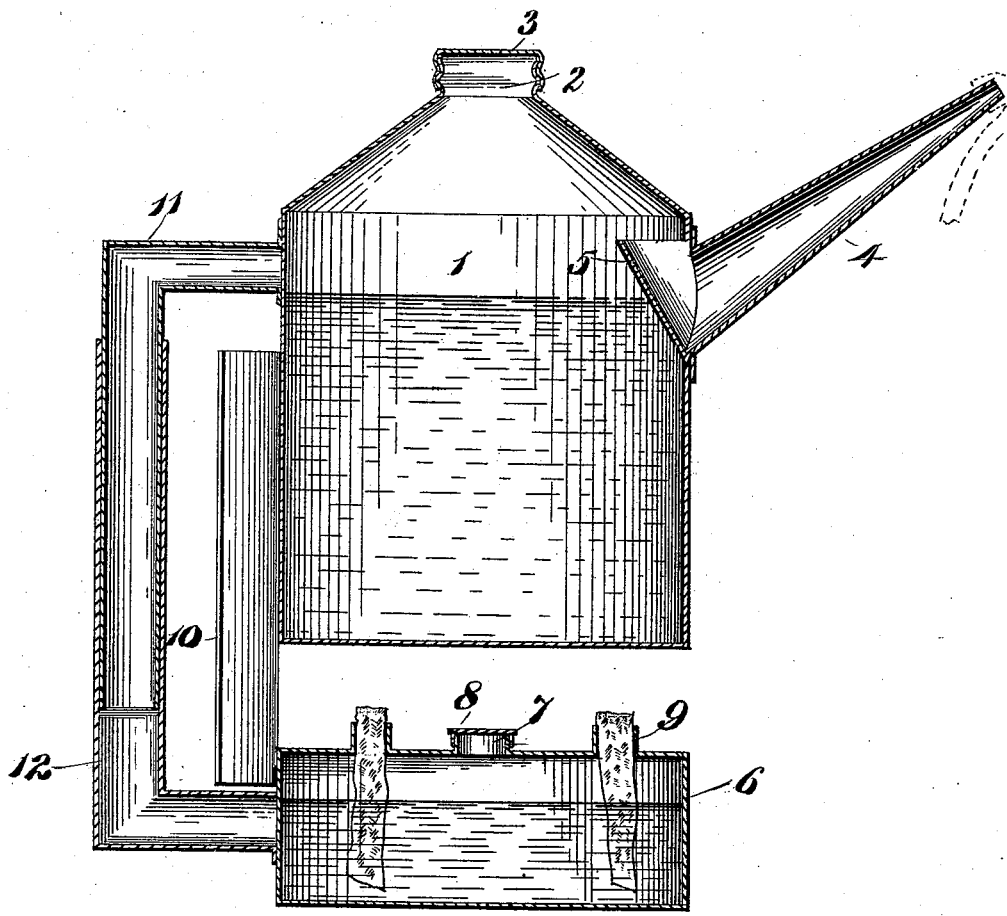
Witnesses
W. T. S. Duvall
J. M. Copenhaver
Inventor:
G. C. Twyman &
M. E. Thomas.
By W. T. Duvall, Attorney

UNITED STATES PATENT OFFICE.

GOODLOE C. TWYMAN AND MARTIN E. THOMAS, OF BOWLING GREEN, KENTUCKY.

INSECT-EXTERMINATOR.

SPECIFICATION forming part of Letters Patent No. 534,127, dated February 12, 1895.

Application filed October 17, 1894. Serial No. 526,203. (No model.)

*To all whom it may concern:*

Be it known that we, GOODLOE C. TWYMAN and MARTIN E. THOMAS, citizens of the United States, residing at Bowling Green, in the county of Warren and State of Kentucky, have invented certain new and useful Improvements in Insect-Exterminators; and we do hereby declare the following to be a full, clear, and exact description of the invention, such as will enable others skilled in the art to which it appertains to make and use the same.

Our invention relates to insect-exterminators; and the objects in view are to provide a cheaply constructed, conveniently manipulated device, adapted to contain and generate steam from any of the well-known insect destroying fluids, and to inject the same into crevices, corners, and masses of goods whereby the full effect of the destroyer is obtained.

A further object of the invention is to so construct the device as to graduate the heat to which the destroying-fluid is subjected, and to provide for a convenient filling of the heating or oil-tank and a cleaning of the same when necessary.

Various other objects and advantages of the invention will hereinafter appear, and the novel features thereof will hereinafter appear and be particularly pointed out in the claims.

Referring to the drawing, which illustrates our invention in vertical section, 1, designates the vessel or tank for receiving the destructive fluid, the same being preferably formed with a flat bottom and with a conical dome, at the apex of which latter is produced a threaded opening 2, over which is fitted a screw-cap 3, that is removable for the introduction of the liquid. The vessel or tank is also provided with a tapered spout 4, at the inlet end of which is located a curved guard 5, so that the liquid may reach the level of the discharge-spout 4 without entering the same.

Arranged below the vessel or tank 1, is the oil-reservoir or heating-tank 6, and the same is provided with a suitably located receiving-orifice, 7, that is threaded, and provided with a screw-cap 8. At suitable points this tank is also provided with burner-openings, 9, in which wicks are introduced.

Reversely disposed L-shaped hollow or tubular handle-sections 11 and 12, extend from the vessel 1 and oil-reservoir 6, respectively, and one of these sections, in this instance, the upper one, telescopes into the lower. By this construction it will be seen that the two sections 11 and 12 may be drawn out or telescoped together, so as to increase or decrease the distance between the vessel 1 and the reservoir 6, and the intensity or degree of heat to which the contents of the vessel 1 is subjected may be varied. We thus avoid the necessity of fitting the burners 9 with the usual feed-devices for the wicks, and are enabled to cheapen the construction of the device to this extent. Furthermore, it will be apparent that the vessel is free to be swung to one side from over the reservoir, and thus the latter may be conveniently filled, the wicks trimmed, and the parts cleaned. We also secure to the vessel 1 a transversely curved guard-plate 10, the same extending down to a point opposite the reservoir and thus shielding the hand of the operator from the flame. The guard is merely secured to the vessel, so that it does not interfere with the swinging of the vessel 1. To permit of such freedom of movement, it is best to have the convexed side of the guard toward the flame.

From the foregoing it will be apparent that we have provided a very simple and cheap construction of device for the purpose designated, wherein the parts are accessible for cleaning, &c., and which may be readily taken apart or collapsed for shipment.

In operation, the liquid is placed in the vessel 1, which is adjusted a proper distance from the wicks, the screw-cap 3 is replaced, and the wicks lighted. The destroying or ex-terminating-liquid is caused to boil and the steam issues and is discharged from the spout 4. The device is now grasped by the operator and the spout inserted into any crevices, corners or holes infested by the insects who are thus subjected to the action of the thus vaporized liquid. By adjusting the two handle sections the liquid may be maintained at the proper boiling point and a saving of the liquid effected.

Carpets and other fabrics, as well as rooms, may be fumigated in a like manner, suitable fumigating or germ-killing liquid being employed. We may also attach a flexible hose, (see dotted lines) to the end of the discharge-spout, should occasion require.

Having thus fully described our invention, what we claim is—

1. In an insect-destroyer or fumigator, the combination with the liquid receiving-tank or vessel provided with a spout, and a subjacent burner-tank or reservoir, of hollow L-shaped reversely disposed telescopic handle-sections extending from the tank and vessel, substantially as specified.

2. In an insect-destroyer or fumigator, the combination with the liquid receiving-tank or vessel provided with a spout, and a subjacent burner-tank or reservoir, of hollow, cylindrical, L-shaped reversely disposed telescopic, swiveled, handle-sections, secured to the reservoir and vessel, substantially as specified.

3. In an insect-destroyer or fumigator, the combination with the liquid receiving-tank or vessel provided with a spout, and a subjacent burner or reservoir having wick and receiver-openings, of the hollow L-shaped reversely disposed handle sections 11 and 12, telescopically connected, and the curved guard-plate 10, secured to the vessel between the same and the handle-sections, substantially as specified.

In testimony whereof we affix our signatures in presence of two witnesses.

GOODLOE C. TWYMAN.
MARTIN E. THOMAS.

Witnesses:
JOHN H. CORWIN,
ELNER FINK.